United States Patent [19]
Gejima et al.

[11] Patent Number: 5,183,786
[45] Date of Patent: Feb. 2, 1993

[54] DIELECTRIC MATERIAL, AND A CONDENSER MADE FROM THE SAME

[75] Inventors: Seiji Gejima, Neyagawa; Koji Kawakita, Joyo; Suzushi Kimura; Hideyuki Okinaka, both of Toyonaka; Yasuhiko Hakotani, Nishinomiya, all of Japan

[73] Assignee: Matsushita Electric Industrial Co., Ltd., Osaka, Japan

[21] Appl. No.: 779,439

[22] Filed: Oct. 18, 1991

[30] Foreign Application Priority Data

Nov. 20, 1990 [JP] Japan .................................. 2-317341

[51] Int. Cl.$^5$ ............................................. C04B 35/46
[52] U.S. Cl. .................................. 501/134; 501/135; 501/136
[58] Field of Search ............... 501/134, 135, 136, 137, 501/139

[56] References Cited

FOREIGN PATENT DOCUMENTS

| 0004280 | 1/1974 | Japan | .................................. 501/134 |
| 63-156062 | 6/1988 | Japan . | |
| 3299006 | 12/1988 | Japan | .................................. 35/46 |
| 1-065070 | 3/1989 | Japan | .................................. 35/49 |

OTHER PUBLICATIONS

"Dielectric lead titanate zirconate compositions" Takagi et al. (1989) JP 01305856 A2 Jpn. Kokai Tokkyo Koho 4 pages.
"A Lead Perovskite μ5 V dielectric for multilayer ceramic capacitor" Furukawa et al. Japanese Journal of Appl. Physics Part 1, 26 (Suppl. 26-2), 34-7 (1987).
"Effect of Excess PbO on the Sintering Characteristics and Dielectric Properties of $Pb(Mg_{1/3}Nb_{2/3})O_3$—$PbTiO_3$ Based Ceramics" Guha et al. *J. American Ceram. Soc.* 71(3) C-152-C-154 (1988).
"Stabilization of the Perovskite Phase and Dielectric Properties in the lead magnesium niobium oxide $[Pb(Mg_{1/3}Nb_{2/3})O_3]$–barium titanate system" Kang et al. *J. Mater. Sci.*, 26(1), pp. 56-60 (1991).
H. Kanai, et al. "Effects of Specific Surface Area Of Starting Pre-Calcined Dielectric Powders On Sintering Behavior And Dielectric Properties Of Relaxor/Modified $BaTiO_3$ Composite", Supp. 28-2, pp. 31-34, *Japanese Journal of Applied Physics* (1989).
K. Ohnishi, et al. "Mix Sintering Ferroelectric Materials Using HIP", *Japanese Journal of Applied Physics*, Supp. 28-2, pp. 74-76 (1989).

*Primary Examiner*—William R. Dixon, Jr.
*Assistant Examiner*—Paul Marcantoni
*Attorney, Agent, or Firm*—Panitch Schwarze Jacobs & Nadel

[57] ABSTRACT

The dielectric material includes a pre-baked powder containing $Pb(Mg_{1/3}Nb_{2/3})O_3$, $BaTiO_3$, and $BaZrO_3$, and lead oxides alone or lead oxides and copper oxides in combination. Thus, the dielectric material is sintered at low temperatures of 800°-1000° C., and makes it possible to use inexpensive electrode materials such as copper, silver, and silver-palladium alloy for the electrode. The dielectric material also makes it possible to produce a ceramic condenser or a thin condenser having a stable capacitance irrespective of changes in temperature.

7 Claims, 1 Drawing Sheet

DIELECTRIC MATERIAL, AND A CONDENSER MADE FROM THE SAME

BACKGROUND OF THE INVENTION

1. Field of the Invention

The present invention relates to a dielectric material that can be baked at low temperatures for a short period of time, and a condenser made from the dielectric material, thereby having excellent temperature characteristics, such as a dielectric constant varying within 10% of the base value measured at 20° C. in the temperature range of −25° C. to 85° C.

2. Description of the Prior Art

Ceramic condensers are comprised of a dielectric material and electrodes placed on both sides of the dielectric material. The dielectric material requires, as one of electric properties the temperature dependence of its dielectric constant which is defined by JIS, etc. Examples of the dielectric materials having excellent temperature characteristics of dielectric constant include barium titanate materials which are used for conventional ceramic condensers.

These dielectric materials are usually baked in the manufacturing process of the ceramic condenser. However, the barium titanate materials should be baked at high temperatures of approximately 1300° C in the atmosphere. Electrode materials that can be used at such high temperatures during the baking process include only noble metals which have relatively high melting points, for example platinum, palladium, etc. The use of these expensive noble metals leads to the increase of the ceramic condenser prices.

In order to obtain inexpensive ceramic condensers, the development of dielectric materials having lower baking temperatures and replacing barium titanium have been demanded. The proposed dielectric materials are ones made of perovskite type materials containing lead ion as a base, which have not only low baking temperatures, but provide excellent temperature characteristics of dielectric constant. Since these dielectric materials are sintered at these low temperatures, less expensive electrode materials having lower melting points, e.g., silver-palladium alloy can be used. Therefore, using these dielectric materials, and the electrode materials, ceramic condensers can be made at a lower cost.

With the recent development of compact and very reliable electronic devices, a thick-film condenser has been demanded as a ceramic condenser instead of a conventional chip condenser as the number of circuits placed on a single plate is increased. The thick-film condenser structurally requires a dielectric material that can be baked not only at low temperatures, but for a short period of time. Therefore, a dielectric material that can be used for such a thick-film condenser with flat temperature characteristics will be increasingly required.

However, the aforementioned perovskite type dielectric material must be sintered in an atmosphere of low partial oxygen pressure so as to avoid oxidation and also be maintained at a temperature of 1000° C. or higher for several hours so as to obtain a solid sintered body with a high dielectric constant. When a thick-film condenser is manufactured using the above proposed materials, the dielectric material cannot be sufficiently sintered because a low-temperature and short-time sintering process is required for a thickfilm condenser, thus failing in obtaining a desired characteristic of the condenser. If it is intended to sinter the dielectric material completely, the sintering temperature must be 1000° C. or higher. At such high temperatures, as mentioned above, electrode materials may be oxidized, and therefore, the above-mentioned silver-palladium alloy, or copper that has a further lower melting point, cannot be used, thus preventing the manufacture of ceramic condensers at a lower cost.

The objective of this invention is to provide a dielectric material which has the flat temperature characteristics of dielectric constant and is able to be sintered at a low temperature of 1000° C. or lower in a short period of time. The another objective of this invention is to provide an inexpensive condenser using such a dielectric material.

SUMMARY OF THE INVENTION

The dielectric material of this invention, which overcomes the above-discussed and numerous other disadvantages and deficiencies of the prior art, comprises a dielectric porcelain composition represented by the following general formula in the form of a prebaked powder, and 1.0–25.0 mole % of lead oxides in which the amounts of the lead oxides are converted into the amount of PbO:

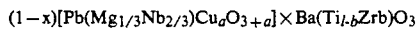

$$(1-x)[Pb(Mg_{1/3}Nb_{2/3})Cu_aO_{3+a}] \times Ba(Ti_{l-b}Zr_b)O_3$$

wherein, x, a and b values satisfy $0.30 < x < 0.80$, $0 \leq a \leq 0.30$, and $0 \leq b \leq 0.15$.

In a preferred embodiment, the dielectric porcelain composition is a mixture of the solid solution of $BaTiO_3$ and $BaZrO_3$ and $Pb(Mg_{1/3}Nb_{2/3})Cu_aO_{3+a}$.

In a preferred embodiment, the lead oxide is PbO, $Pb_3O_4$, or $PbO_2$.

Another dielectric material of this invention comprises a dielectric porcelain composition represented by the following general formula in the form of a prebaked powder, and 1.0–25.0 mole % of lead oxides, and 1.0–15.0 mole % of copper oxides in which the amounts of the lead oxides, and the copper oxides are converted into those of PbO, and CuO, respectively:

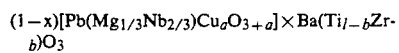

$$(1-x)[Pb(Mg_{1/3}Nb_{2/3})Cu_aO_{3+a}] \times Ba(Ti_{l-b}Zr_b)O_3$$

wherein, x, a and b values satisfy $0.30 < x < 0.80$, $0 \leq a \leq 0.25$, and $0 \leq b \leq 0.15$.

In a preferred embodiment, the dielectric porcelain composition is a mixture of the solid solution of $BaTiO_3$ and $BaZrO_3$ and $Pb(Mg_{1/3}Nb_{2/3})Cu_aO_{3+a}$.

In a preferred embodiment, the lead oxide is PbO, $Pb_3O_4$, or $PbO_2$.

In a preferred embodiment, the copper oxide is $Cu_2O$ or CuO.

Also, the condenser of this invention comprises a dielectric layer, and electrodes placed on both sides of the dielectric layer, wherein the dielectric layer consists essentially of a dielectric material comprising a dielectric porcelain composition represented by the following general formula in the form of a pre-baked powder, and 1.0–25.0 mole % of lead oxides in which the amounts of the lead oxides are converted into the amount of PbO:

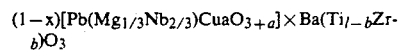

$$(1-x)[Pb(Mg_{1/3}Nb_{2/3})Cu_aO_{3+a}] \times Ba(Ti_{l-b}Zr_b)O_3$$

wherein, x, a and b values satisfy $0.30 < x < 0.80$, $0 \leq a \leq 0.30$, and $0 \leq b \leq 0.15$.

In a preferred embodiment, the electrode is made from copper, silver, or silver-palladium alloy.

Another condenser of this invention comprises a dielectric layer, and electrodes placed on both sides of the dielectric layer, wherein the dielectric layer consists essentially of a dielectric material comprising a dielectric porcelain composition represented by the following general formula in the form of a pre-baked powder, and 1.0–25.0 mole % of lead oxides, and 1.0–15.0 mole % of copper oxides in which the amounts of the lead oxides, and the copper oxides are converted into those of PbO, and CuO, respectively:

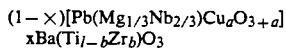

wherein, x, a and b values satisfy $0.30 < x < 0.80$, $0 \leq a \leq 0.25$, and $0 \leq b \leq 0.15$.

In a preferred embodiment, the electrode is made from copper, silver, or silver-palladium alloy.

Another condenser of this invention comprises a ceramic base plate, a lower electrode, a dielectric layer, and an upper electrode, wherein the lower electrode, the dielectric layer, and the upper electrode are laminated in this order on the ceramic base plate, wherein the dielectric layer consists essentially of a dielectric material comprising a dielectric porcelain composition represented by the following general formula in the form of a pre-baked powder, and 1.0–25.0 mole % of lead oxides in which the amounts of the lead oxides are converted into the amount of PbO:

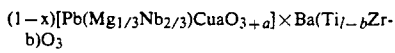

wherein, x, a and b values satisfy $0.30 < x < 0.80$, $0 \leq a \leq 0.30$, and $0 \leq b \leq 0.15$.

In a preferred embodiment, the electrode is made from copper, silver, or silver-palladium alloy.

Another condenser of this invention comprises a ceramic base plate, a lower electrode, a dielectric layer, and an upper electrode, wherein the lower electrode, the dielectric layer, and the upper electrode are laminated in this order on the ceramic base plate, wherein the dielectric layer consists essentially of a dielectric material comprising a dielectric porcelain composition represented by the following general formula in the form of a pre-baked powder, and 1.0–25.0 mole % of lead oxides, and 1.0–15.0 mole % of copper oxides in which the amounts of the lead oxides, and the copper oxides are converted into those of PbO, and CuO, respectively:

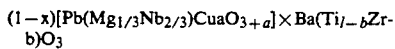

wherein, x, a and b values satisfy $0.30 < x < 0.80$, $0 \leq a \leq 0.25$, and $0 \leq b \leq 0.15$.

In a preferred embodiment, the electrode is made from copper, silver, or silver-palladium alloy.

Thus, the invention described herein makes possible the objectives of (1) providing a dielectric material that can be baked at low temperatures of 1000° C. or less for a short period of time; and (2) providing a condenser which is made from the dielectric material, and has excellent temperature characteristics, i.e., stable dielectric characteristics at different temperatures, for example a dielectric constant varying within 10% of the base value measured at 20° C. in the temperature range of −25° C. to 85° C.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

The following examples illustrate the present invention in detail.

EXAMPLE 1

A $Pb(Mg_{1/3}Nb_{2/3})CuaO_{3+a}$ (hereinafter referred to as PMN) powder is prepared by pre-baking the combination of the prescribed amounts of MgO and $Nb_2O_5$ at 950° C. for 5 hours in the atmosphere to obtain $MgNb_2O_6$, grinding the $MgNb_2O_6$ by a ball mill, then pre-baking the combination of the prescribed amounts of the ground $MgNb_2O_6$, PbO and CuO at 900° C. for 2 hours in the atmosphere, and grinding the combination by a ball mill.

On the other hand, a solid solution of $BaTiO_3$ and $BaZrO_3$ (hereinafter referred to as BTZ) is prepared by pre-baking the combination of the prescribed amounts of $BaCO_3$, $TiO_2$ and $ZrO_2$ at 1300° C. for 2 hours in the atmosphere, and then grinding the combination by a ball mill.

Then, the prescribed amounts of the resulting PMN powder, and BTZ powder are wet-blended by a ball mill, and dried. The dried mixture is pre-baked at 800° C. for 2 hours in the atmosphere, ground by a ball mill, and dried. To this mixture PbO and CuO are added as sub-components with mixing by a mixing and grinding machine. To the powder mixture, 6 wt % polyvinylalcohol solution is added as a binder in the amount of 6 wt % of the mixture, and granulated by a 32 mesh sieve.

The final mixture is molded under a pressure of 1000 kg/cm² in the form of a disk having about 13 mm diameter, and about 5 mm thickness. Then, the molding is allowed to stand at 600° C. for 1 hour in the atmosphere to remove the binder, and baked at 900° C. for 10 minutes under a nitrogen atmosphere.

Figure 1:
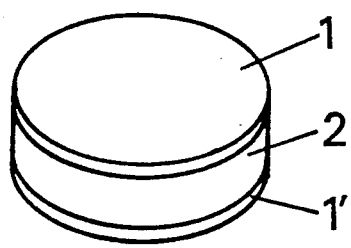
FIG. 1 is a perspective view of the ceramic condenser illustrating one embodiment of this invention.

The baked molding is worked into a disk having 1 mm thickness, coated with an Ag paste on both sides as electrodes, and dried at 120° C. in the atmosphere to form a single-plate condenser as shown in FIG. 1. The condenser comprises of electrodes 1, 1′, and a dielectric layer 2 as shown in FIG. 1.

Table 1 illustrates the composition of the major components and the sub-components contained in the dielectric materials of this example. Also, Table 2 illustrates the dielectric characteristics of the single-plate condenser, i.e., dielectric constant, tan δ (dielectric loss factor), and insulation resistance, and temperature variation percentage of the dielectric constant (a value measured at 20° C. is the base value). The dielectric constant, and tan δ (dielectric loss factor) are measured under an electric field of 1 kHz and 1 V/mm. Also, the dielectric resistance is measured one minute after a 30 V is applied.

TABLE 1

| | (1 − x) {Pb(Mg$_{\frac{1}{3}}$Nb$_{\frac{2}{3}}$)Cu$_a$O$_{3+a}$} xBa(Ti$_{1-b}$Zr$_b$)O$_3$ | | | Composition of the sub-component (mol %) | |
|---|---|---|---|---|---|
| Sample | Composition of the major component | | | | |
| No. | x | a | b | PbO | CuO |
| 1# | 0.30 | 0.00 | 0.00 | 15.0 | 5.0 |
| 2 | 0.40 | 0.05 | 0.00 | 5.0 | 1.0 |
| 3 | 0.40 | 0.05 | 0.00 | 15.0 | 5.0 |
| 4 | 0.40 | 0.05 | 0.00 | 25.0 | 10.0 |
| 5# | 0.40 | 0.05 | 0.10 | 0.0 | 0.0 |
| 6 | 0.40 | 0.10 | 0.10 | 5.0 | 0.0 |
| 7 | 0.40 | 0.10 | 0.10 | 15.0 | 0.0 |
| 8 | 0.40 | 0.10 | 0.10 | 25.0 | 0.0 |
| 9 | 0.45 | 0.13 | 0.04 | 5.0 | 1.0 |
| 10 | 0.45 | 0.13 | 0.04 | 15.0 | 5.0 |
| 11 | 0.45 | 0.13 | 0.04 | 25.0 | 10.0 |
| 12# | 0.40 | 0.05 | 0.10 | 30.0 | 20.0 |
| 13# | 0.40 | 0.20 | 0.15 | 15.0 | 5.0 |
| 14# | 0.40 | 0.35 | 0.10 | 15.0 | 5.0 |
| 15 | 0.40 | 0.15 | 0.00 | 5.0 | 1.0 |
| 16 | 0.40 | 0.15 | 0.00 | 15.0 | 5.0 |
| 17 | 0.40 | 0.15 | 0.00 | 25.0 | 10.0 |
| 18 | 0.68 | 0.15 | 0.00 | 5.0 | 1.0 |
| 19 | 0.68 | 0.15 | 0.00 | 15.0 | 5.0 |
| 20# | 0.45 | 0.13 | 0.21 | 15.0 | 5.0 |
| 21# | 0.85 | 0.00 | 0.00 | 15.0 | 5.0 |
| 22# | 0.40 | 0.30 | 0.10 | 15.0 | 1.0 |
| 23 | 0.40 | 0.25 | 0.10 | 15.0 | 1.0 |

Samples Nos. 1, 5, 12–14 and 20–22 are control samples.

TABLE 2

| | Dielectric characteristic | | | Temperature variation percentage of the dielectric constant (%) | |
|---|---|---|---|---|---|
| Sample | Dielectric | tan δ | Insulation resistance | | |
| No. | constant | (%) | 10$^{12}$ Ωcm | −25° C. | 85° C. |
| 1# | 1100 | 4.5 | 0.06 | −14.2 | −16.3 |
| 2 | 520 | 2.0 | 1.15 | −8.3 | −6.2 |
| 3 | 1680 | 2.1 | 1.02 | −8.1 | −5.9 |
| 4 | 1120 | 2.2 | 0.94 | −9.1 | −6.1 |
| 5# | 220 | 3.8 | 0.87 | −11.0 | −9.8 |
| 6 | 570 | 1.8 | 1.70 | −7.5 | −2.5 |
| 7 | 1900 | 2.1 | 1.53 | −7.5 | −6.8 |
| 8 | 1520 | 2.3 | 1.17 | −9.3 | −8.0 |
| 9 | 480 | 1.7 | 1.98 | −8.0 | −2.1 |
| 10 | 1850 | 1.9 | 2.04 | −8.2 | −2.5 |
| 11 | 1560 | 2.2 | 1.82 | −9.6 | −3.4 |
| 12# | 1200 | 3.1 | 0.07 | −7.5 | −12.0 |
| 13# | 1450 | 2.5 | 1.30 | −5.3 | −12.3 |
| 14# | 1500 | 7.4 | 0.04 | −10.1 | −11.5 |
| 15 | 420 | 1.6 | 1.14 | −8.9 | −5.2 |
| 16 | 1330 | 1.8 | 1.22 | −8.9 | −6.1 |
| 17 | 920 | 2.1 | 0.94 | −9.1 | −6.0 |
| 18 | 320 | 2.0 | 1.26 | −8.8 | −6.9 |
| 19 | 1180 | 2.2 | 1.03 | −8.2 | −7.1 |
| 20# | 710 | 2.3 | 0.90 | −8.9 | −12.6 |
| 21# | 1300 | 2.2 | 0.31 | −15.6 | −15.1 |
| 22# | 1060 | 3.4 | 0.64 | −9.1 | −10.6 |
| 23 | 1120 | 2.1 | 1.04 | −8.9 | −9.1 |

Samples Nos. 1, 5, 12–14 and 20–22 are control samples.

As can be seen from Tables 1 and 2, the dielectric materials of this invention (samples Nos. 2–4, 6–11, 15–19, and 23) are sintered sufficiently, and have a lower temperature variation percentage, i.e., a dielectric constant varying within 10% of the base value measured at 20° C. in the temperature range of −25° C. to 85° C., and a high enough insulation resistance for practical uses even though it is baked at a low temperature of 900° C. for a short period of time. Especially, the dielectric materials have improved temperature characteristics in high temperature areas because a suitable amount of Zr atom contained therein reduces its Curie point.

On the other hand, control sample No. 5 is not sintered sufficiently at 900° C. because of the lower amounts of PbO and CuO, i.e., the absence of PbO or CuO as the sub-component, and therefore provides an unacceptably lower dielectric constant. Although control sample No. 12 containing the excess amounts of PbO and CuO is sintered sufficiently, it has unsatisfactory temperature characteristics of dielectric constant, i.e., a higher temperature variation percentage, and increased dielectric loss which is not acceptable for practical uses. When a small amount of BTZ is added (control sample No. 1), the dielectric constant of the resulting dielectric material has higher temperature dependence derived from PMN. On the other hand, control sample No. 21 containing a large amount of BTZ is neither sintered sufficiently, nor provides excellent characteristics derived from PMN. Also, control sample No. 20 which contains a large amount of Zr does not provide good temperature characteristics because of severely reduced Curie point. Moreover, control sample No. 14 is not acceptable because of low dielectric loss factor derived from the excess amount of Cu contained in PMN.

EXAMPLE 2

Single-plate condensers are made by the same procedure as in Example 1 except that the powder mixture is prepared by adding as the sub-components the prescribed amounts of Pb$_3$O$_4$, PbO$_2$ and Cu$_2$O to the dielectric porcelain composition represented by the following formula:

0.60[Pb(Mg$_{1/3}$Nb$_{2/3}$)Cu$_{0.1}$O$_{3.1}$]0.40Ba(Ti$_{0.9}$Zr$_{0.1}$)O$_3$

The dielectric characteristics of the single-plate condensers, i.e., dielectric constant, dielectric loss factor, insulation resistance, and temperature variation percentage of the dielectric constant (a value measured at 20° C. is the base value) are also measured in the same manner.

Table 3 illustrates the amounts added of Pb$_3$O$_4$, PbO$_2$ and Cu$_2$O. Table 4 illustrates the dielectric characteristics, i.e., dielectric constant, tan δ (dielectric loss factor), and insulation resistance, and temperature variation percentage of the dielectric constant.

TABLE 3

| Sample | Added amount of sub-component (mol %) | | | | |
|---|---|---|---|---|---|
| No. | PbO | Pb$_3$O$_4$ | PbO$_2$ | CuO | Cu$_2$O |
| 1 | 15.0 | 0.0 | 0.0 | 0.0 | 0.0 |
| 2 | 15.0 | 0.0 | 0.0 | 5.0 | 0.0 |
| 3 | 0.0 | 5.0 | 0.0 | 0.0 | 0.0 |
| 4 | 0.0 | 15.0 | 0.0 | 5.0 | 0.0 |
| 5# | 0.0 | 30.0 | 0.0 | 10.0 | 0.0 |
| 6 | 0.0 | 0.0 | 5.0 | 1.0 | 0.0 |
| 7 | 0.0 | 0.0 | 15.0 | 5.0 | 0.0 |
| 8 | 0.0 | 0.0 | 25.0 | 10.0 | 0.0 |
| 9 | 5.0 | 0.0 | 0.0 | 0.0 | 1.0 |
| 10 | 15.0 | 0.0 | 0.0 | 0.0 | 5.0 |
| 11 | 20.0 | 0.0 | 0.0 | 0.0 | 10.0 |
| 12# | 15.0 | 0.0 | 0.0 | 0.0 | 20.0 |

TABLE 3-continued

| Sample No. | Added amount of sub-component (mol %) | | | | |
|---|---|---|---|---|---|
| | PbO | Pb$_3$O$_4$ | PbO$_2$ | CuO | Cu$_2$O |
| 13 | 25.0 | 0.0 | 0.0 | 15.0 | 0.0 |

Samples Nos. 5 and 12 are control samples.
The added amount of each Pb$_3$O$_4$ and PbO$_2$ are converted into that of PbO, and the added amount of Cu$_2$O into that of CuO.

TABLE 4

| Sample No. | Dielectric characteristic | | | Temperature variation percentage of the dielectric constant (%) | |
|---|---|---|---|---|---|
| | Dielectric constant | tan δ (%) | Insulation resistance $10^{12}$ Ωcm | −25° C. | 85° C. |
| 1 | 1910 | 2.1 | 1.53 | −7.3 | −6.5 |
| 2 | 1880 | 2.1 | 1.49 | −7.3 | −6.9 |
| 3 | 570 | 2.0 | 0.84 | −8.9 | −8.3 |
| 4 | 1900 | 1.9 | 1.61 | −6.9 | −7.2 |
| 5# | 1150 | 5.4 | 0.06 | −10.9 | −9.8 |
| 6 | 580 | 1.9 | 0.98 | −7.9 | −8.8 |
| 7 | 1900 | 2.1 | 1.03 | −7.7 | −8.4 |
| 8 | 1190 | 2.3 | 1.10 | −7.9 | −7.8 |
| 9 | 490 | 2.2 | 0.76 | −8.7 | −6.9 |
| 10 | 1870 | 2.0 | 1.38 | −7.2 | −7.1 |
| 11 | 1510 | 2.3 | 0.75 | −9.1 | −8.9 |
| 12# | 1220 | 7.5 | 0.03 | −11.8 | −13.1 |
| 13 | 1100 | 2.3 | 0.89 | −8.6 | −9.1 |

Samples Nos. 5 and 12 are control samples.

As can be seen from Tables 3 and 4, the dielectric materials of this invention (samples Nos. 2-4, 6-11, 15-19, and 23) are sintered sufficiently, and have a lower temperature variation percentage, i.e., a dielectric constant varying within 10% of the base value measured at 20° C. in the temperature range of −25° C. to 85° C., and a high enough insulation resistance for practical uses even though it is baked at a low temperature of 900° C. for a short period of time.

When Cu$_2$O is used as the sub-component added in the dielectric composition of major components, almost the same results as using CuO in Example 1 are achieved because Cu$_2$O is oxidized to CuO under atmospheric baking conditions. Also, because Pb$_3$O$_4$ and PbO$_2$ are decomposed into PbO and oxygen at the baking temperature, the same results as when PbO is used in Example 1 are obtained.

EXAMPLE 3

To the dielectric composition of major components which is pre-baked and dried by the same procedure as in Example 1, there are added the prescribed amounts of PbO and CuO with wet-blending by a ball mill, and then dried. Then, a vehicle of a resin which contains ethyl cellulose as a major component dissolved in a solvent is added to the mixture of major component and sub-component, and kneaded by a three-stage roll to prepare a dielectric paste.

Figure 2:
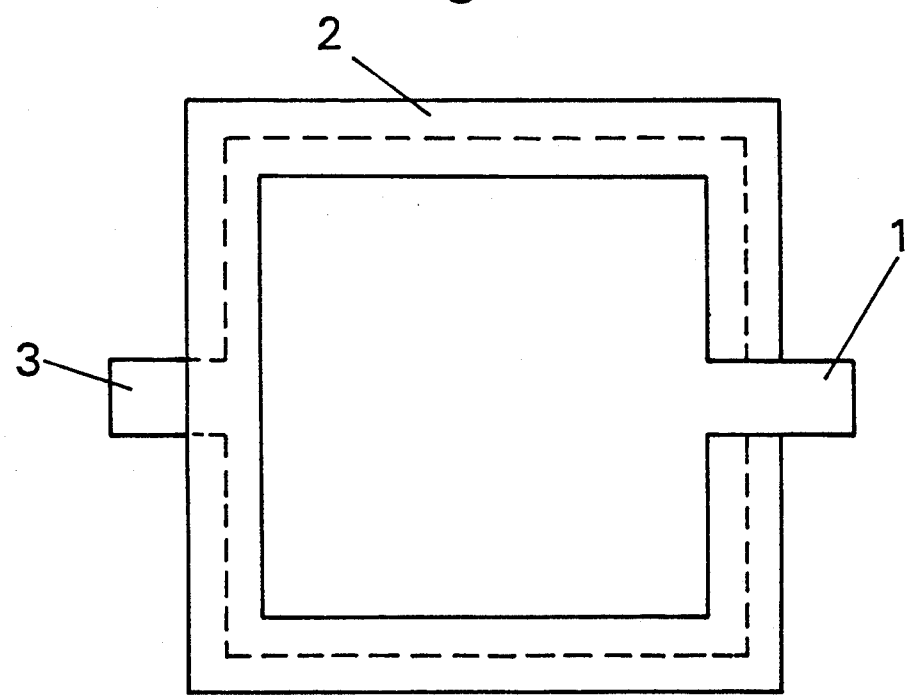
FIG. 2 is a top plan view of the thick-film condenser illustrating one embodiment of this invention.
Figure 3:
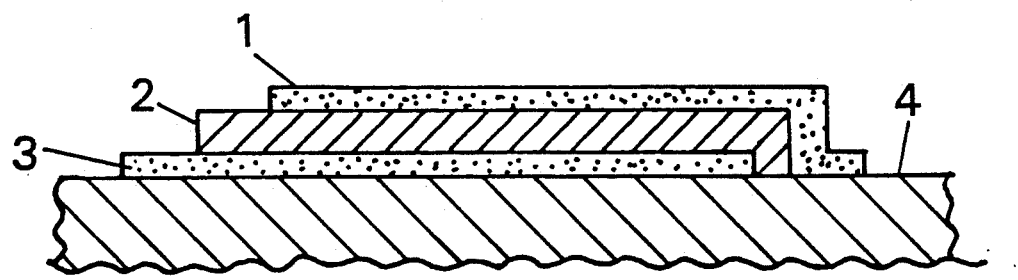
FIG. 3 is a side cross-sectional view of the thick-film condenser illustrating one embodiment of this invention.

On the other hand, copper paste is coated as a lower electrode 3 on an alumina base plate 4 having 96% purity, and dried as shown in FIGS. 2 and 3.

Then, the aforementioned dielectric paste is coated in a 50-60 μm thickness on the lower electrode 3, and dried to form a dielectric layer 2. Moreover, the same copper paste as used for the lower electrode 3 is coated as an upper electrode 1 on the dielectric layer 2 and dried to form a thick film having a laminated structure of three layers, i.e., electrode - dielectric layer - electrode. The thick film is baked in a belt furnace at 800-1000° C. for 5-30 minutes under a nitrogen atmosphere to form a thick-film condenser. The dielectric characteristics of the thick-film condenser, i.e., dielectric constant, tan δ (dielectric loss factor), and insulation resistance, and temperature variation percentage of the dielectric constant are measured. The dielectric constant, and tan δ (dielectric loss factor) are measured under electric field of 1 kHz and 1 V/mm. Also, the dielectric resistance is measured one minute after 30 V is applied.

Table 5 illustrates the composition of the major components and the sub-components used in the dielectric materials. Also, Table 6 illustrates the dielectric characteristics, i.e., dielectric constant, tan δ (dielectric loss factor), and insulation resistance, and temperature variation percentage of the dielectric constant (a value measured at 20° C. is the base value) of the thick-film condenser prepared by baking at 900° C. for 10 minutes under a nitrogen atmosphere.

TABLE 5

| | $(1 - x)\ \{Pb(Mg_{\frac{1}{3}}Nb_{\frac{2}{3}})Cu_aO_{3+a}\}$ $xBa(Ti_{1-b}Zr_b)O_3$ | | | | |
|---|---|---|---|---|---|
| Sample No. | Composition of the major component | | | Composition of the sub-component (mol %) | |
| | x | a | b | PbO | CuO |
| 1# | 0.30 | 0.00 | 0.00 | 15.0 | 5.0 |
| 2 | 0.40 | 0.05 | 0.00 | 5.0 | 1.0 |
| 3 | 0.40 | 0.05 | 0.00 | 15.0 | 5.0 |
| 4 | 0.40 | 0.05 | 0.00 | 25.0 | 10.0 |
| 5# | 0.40 | 0.05 | 0.10 | 0.0 | 0.0 |
| 6 | 0.40 | 0.10 | 0.10 | 5.0 | 0.0 |
| 7 | 0.40 | 0.10 | 0.10 | 15.0 | 0.0 |
| 8 | 0.40 | 0.10 | 0.10 | 25.0 | 0.0 |
| 9 | 0.45 | 0.13 | 0.04 | 5.0 | 1.0 |
| 10 | 0.45 | 0.13 | 0.04 | 15.0 | 5.0 |
| 11 | 0.45 | 0.13 | 0.04 | 25.0 | 10.0 |
| 12# | 0.40 | 0.05 | 0.10 | 30.0 | 20.0 |
| 13# | 0.40 | 0.20 | 0.15 | 15.0 | 5.0 |
| 14# | 0.40 | 0.35 | 0.10 | 15.0 | 5.0 |
| 15 | 0.40 | 0.15 | 0.00 | 5.0 | 1.0 |
| 16 | 0.40 | 0.15 | 0.00 | 15.0 | 5.0 |
| 17 | 0.40 | 0.15 | 0.00 | 25.0 | 10.0 |
| 18 | 0.68 | 0.15 | 0.00 | 5.0 | 1.0 |
| 19 | 0.68 | 0.15 | 0.00 | 15.0 | 5.0 |
| 20# | 0.45 | 0.13 | 0.21 | 15.0 | 5.0 |
| 21# | 0.85 | 0.00 | 0.00 | 15.0 | 5.0 |
| 22# | 0.40 | 0.30 | 0.10 | 15.0 | 1.0 |
| 23 | 0.40 | 0.25 | 0.10 | 15.0 | 1.0 |

Samples Nos. 1, 5, 12-14 and 20-22 are control samples.

TABLE 6

| Sample No. | Dielectric characteristic | | | Temperature variation percentage of the dielectric constant (%) | |
|---|---|---|---|---|---|
| | Dielectric constant | tan δ (%) | Insulation resistance $10^{12}$ Ωcm | −25° C. | 85° C. |
| 1# | 1220 | 4.1 | 0.11 | −12.2 | −15.1 |
| 2 | 730 | 1.3 | 1.05 | −7.3 | −6.5 |
| 3 | 1740 | 1.6 | 1.22 | −7.8 | −5.9 |
| 4 | 1250 | 1.9 | 0.96 | −8.8 | −6.1 |
| 5# | 410 | 3.0 | 0.89 | −10.7 | −10.1 |
| 6 | 610 | 1.8 | 1.50 | −7.5 | −3.5 |
| 7 | 1960 | 1.8 | 1.73 | −7.8 | −7.1 |
| 8 | 1640 | 1.9 | 1.35 | −9.3 | −8.0 |
| 9 | 510 | 1.4 | 1.70 | −8.0 | −3.2 |
| 10 | 1850 | 1.9 | 2.04 | −7.8 | −3.5 |
| 11 | 1590 | 2.1 | 1.82 | −9.6 | −3.4 |
| 12# | 1180 | 3.0 | 0.09 | −8.6 | −12.3 |
| 13# | 1500 | 2.3 | 1.30 | −5.3 | −12.5 |
| 14# | 1440 | 6.9 | 0.10 | −10.6 | −11.7 |
| 15 | 450 | 1.6 | 1.34 | −8.7 | −5.0 |
| 16 | 1380 | 1.7 | 1.32 | −8.1 | −5.8 |
| 17 | 890 | 1.8 | 1.00 | −8.7 | −6.2 |
| 18 | 420 | 1.7 | 1.26 | −7.8 | −6.9 |
| 19 | 1270 | 2.0 | 1.15 | −8.1 | −7.2 |
| 20# | 730 | 2.1 | 0.95 | −8.7 | −13.1 |
| 21# | 1370 | 1.9 | 0.52 | −15.4 | −14.7 |
| 22# | 1100 | 3.9 | 0.59 | −9.0 | −10.1 |

TABLE 6-continued

| Sample No. | Dielectric characteristic | | | Temperature variation percentage of the dielectric constant (%) | |
|---|---|---|---|---|---|
| | Dielectric constant | tan δ (%) | Insulation resistance $10^{12}$ Ωcm | −25° C. | 85° C. |
| 23 | 1190 | 2.0 | 1.10 | −8.6 | −8.9 |

Samples Nos. 1, 5, 12–14 and 20–22 are control samples.

As can be seen from Tables 5 and 6, the dielectric materials of this invention (samples Nos. 2–4, 6–11, 15–19, and 23) is sintered sufficiently, and have a lower temperature variation percentage, i.e., a dielectric constant varying within 10% of the value measured at 20° C. in the temperature range of −25° C. to 85° C., and a high enough insulation resistance, enough for practical uses even though it is baked at a low temperature of 900° C. for a short period of time. Especially, the dielectric material has improved temperature characteristics in high temperature areas because of the suitable amount of Zr atoms contained therein reduces its Curie point.

On the other hand, control sample No. 5 is not sintered sufficiently at 900° C. because of the lower amounts of PbO and CuO, i.e., the absence of PbO or CuO as the sub-component, and therefore provides an unacceptably lower dielectric constant. Although control sample No. 12 containing the excess amounts of PbO and CuO is sintered sufficiently, it has unsatisfactory temperature characteristics of dielectric constant, i.e., a higher temperature variation percentage and increased dielectric loss which is not acceptable for practical uses. As described in Example 1, when a small amount of BTZ is added (control sample No. 1), the dielectric constant of the resulting dielectric material has higher temperature dependence derived from PMN. On the other hand, control sample No. 21 containing a large amount of BTZ is neither sintered sufficiently, nor provides excellent characteristics derived from PMN. Also, control sample No. 20 which contains a large amount of Zr does not provide good temperature characteristics because of a severely reduced Curie point. Moreover, control sample No. 14 is not acceptable because of a low dielectric loss factor derived from the excess amount of Cu contained in the PMN.

EXAMPLE 4

Thick-film condensers are made by the same procedure as in Example 3 except that the powder mixture is prepared by adding the prescribed amounts of $Pb_3O_4$, $PbO_2$ and $Cu_2O$ to the dielectric composition represented by the following formula:

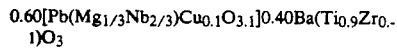
0.60[Pb(Mg$_{1/3}$Nb$_{2/3}$)Cu$_{0.1}$O$_{3.1}$]0.40Ba(Ti$_{0.9}$Zr$_{0.1}$)O$_3$ The dielectric characteristics of the thick-film condensers, i.e., dielectric constant tan δ, dielectric loss factor, insulation resistance, and temperature variation percentage of the dielectric constant are also measured in the same manner.

Table 7 illustrates the amounts added of $Pb_3O_4$, $PbO_2$ and $Cu_2O$. Table 8 illustrates the dielectric characteristics, i.e., dielectric constant, tan δ (dielectric loss factor), and insulation resistance, and temperature variation percentage of the dielectric constant.

TABLE 7

| Sample No. | Added amount of sub-component (mol %) | | | | |
|---|---|---|---|---|---|
| | PbO | $Pb_3O_4$ | $PbO_2$ | CuO | $Cu_2O$ |
| 1 | 15.0 | 0.0 | 0.0 | 0.0 | 0.0 |
| 2 | 15.0 | 0.0 | 0.0 | 5.0 | 0.0 |
| 3 | 0.0 | 5.0 | 0.0 | 0.0 | 0.0 |
| 4 | 0.0 | 15.0 | 0.0 | 5.0 | 0.0 |
| 5# | 0.0 | 30.0 | 0.0 | 10.0 | 0.0 |
| 6 | 0.0 | 0.0 | 5.0 | 1.0 | 0.0 |
| 7 | 0.0 | 0.0 | 15.0 | 5.0 | 0.0 |
| 8 | 0.0 | 0.0 | 25.0 | 10.0 | 0.0 |
| 9 | 5.0 | 0.0 | 0.0 | 0.0 | 1.0 |
| 10 | 15.0 | 0.0 | 0.0 | 0.0 | 5.0 |
| 11 | 20.0 | 0.0 | 0.0 | 0.0 | 10.0 |
| 12# | 15.0 | 0.0 | 0.0 | 0.0 | 20.0 |
| 13 | 25.0 | 0.0 | 0.0 | 15.0 | 0.0 |

Samples Nos. 5 and 12 are control samples.
The added amount of each $Pb_3O_4$ and $PbO_2$ are converted into that of PbO, and the added amount of $Cu_2O$ into that of CuO.

TABLE 8

| Sample No. | Dielectric characteristic | | | Temperature variation percentage of the dielectric constant (%) | |
|---|---|---|---|---|---|
| | Dielectric constant | tan δ (%) | Insulation resistance $10^{12}$ Ωcm | −25° C. | 85° C. |
| 1 | 1880 | 1.9 | 1.49 | −7.2 | −6.4 |
| 2 | 1900 | 2.0 | 1.45 | −7.3 | −6.5 |
| 3 | 640 | 2.3 | 1.25 | −8.4 | −7.9 |
| 4 | 2050 | 1.8 | 1.81 | −6.7 | −7.5 |
| 5# | 1270 | 5.6 | 0.11 | −10.5 | −10.1 |
| 6 | 710 | 2.1 | 0.95 | −8.0 | −8.5 |
| 7 | 2240 | 2.0 | 1.75 | −7.6 | −8.8 |
| 8 | 1320 | 2.1 | 1.50 | −7.9 | −7.8 |
| 9 | 480 | 2.2 | 0.88 | −8.7 | −6.9 |
| 10 | 1850 | 2.1 | 1.41 | −6.8 | −7.2 |
| 11 | 1490 | 2.3 | 0.77 | −9.0 | −8.9 |
| 12# | 1200 | 7.2 | 0.03 | −12.1 | −12.8 |
| 13 | 1160 | 2.2 | 1.05 | −8.4 | −8.9 |

Samples Nos. 5 and 12 are control samples.

As can be seen from Tables 7 and 8, the dielectric materials of this invention (samples Nos. 2–4, 6–11, 15–19, and 23) are sintered sufficiently, and have a lower temperature variation percentage, i.e., a dielectric constant varying within 10% of the base value measured at 20° C. in the temperature range of −25° C. to 85° C., and a high enough insulation resistance for practical uses even though it is baked at a low temperature of 900° C. for a short period of time.

When $Pb_3O_4$ or $PbO_2$ is used as the sub-component in the dielectric composition, better dielectric characteristics are obtained than using PbO, because $Pb_3O_4$ and $PbO_2$ are decomposed into PbO and oxygen which aids in removing the resin components at baking temperatures.

When $Cu_2O$ is used as the sub-component added in the dielectric composition of major components, almost the same results as using CuO in Example 1 are achieved because $Cu_2O$ is oxidized to CuO by oxygen decomposed from $Pb_3O_4$ or PbO under atmospheric baking conditions.

Additionally, the electrode materials that can be used for the condenser of this invention include those available at the baking temperature of the dielectric material, i.e., 800–1000° C., for example, copper, silver, and silver-palladium alloy, and the like. The use of these electrode materials provides less expensive condensers.

Although the dielectric materials are baked under a nitrogen atmosphere in these examples, they may be baked in the atmosphere.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A dielectric material comprising a dielectric porcelain composition represented by the following general formula in the form of a pre-baked powder, and 1.0–25.0 mole % of lead oxide in which the amount of said lead oxide is converted into the amount of PbO:

$$(1-x)[Pb(Mg_{1/3}Nb_{2/3})Cu_aO_{3+a}]xBa(Ti_{1-b}Zr_b)O_3$$

wherein, x, a and b values satisfy $0.30 < x < 0.80$, $0 \leq a \leq 0.30$, and $0 \leq b \leq 0.15$.

2. The dielectric material of claim 1, wherein said dielectric porcelain composition is a mixture of the solid solution of $BaTiO_3$ and $BaZrO_3$, and $Pb(Mg_{1/3}Nb_{2/3})Cu_aO_{3+a}$.

3. The dielectric material of claim 1, wherein said lead oxide is PbO, $Pb_3O_4$, or $PbO_2$.

4. A dielectric material comprising a dielectric porcelain composition represented by the following general formula in the form of a pre-baked powder, and 1.0–25.0 mole % of lead oxide, and 1.0–15.0 mole % of copper oxide in which the amounts of said lead oxide, and said copper oxide are converted into those of PbO, and CuO, respectively:

$$(1-x)[Pb(Mg_{1/3}Nb_{2/3})Cu_aO_{3+a}]xBa(Ti_{1-b}Zr_b)O_3$$

wherein, x, a and b values satisfy $0.30 < x < 0.80$, $0 \leq z \leq 0.30$, and $0 \leq b \leq 0.15$.

5. The dielectric material of claim 4, wherein said dielectric porcelain composition is a mixture of the solid solution of $BaTiO_3$ and $BaZrO_3$, and $Pb(Mg_{1/3}Nb_{2/3})Cu_aO_{3+a}$.

6. The dielectric material of claim 4, wherein said lead oxide is PbO, $Pb_3O_4$, or $PbO_2$.

7. The dielectric material of claim 4, wherein said copper oxide is $Cu_2O$ or CuO.

UNITED STATES PATENT AND TRADEMARK OFFICE
CERTIFICATE OF CORRECTION

PATENT NO. : 5,183,786
DATED : February 2, 1993
INVENTOR(S) : Seiji Gejima et al.

It is certified that error appears in the above-identified patent and that said Letters Patent is hereby corrected as shown below:

In the formula in column 2, line 67; column 3, lines 36 and 56; and column 4, line 27, "Cua" should read --$Cu_a$--.

At column 10, line 67, "anitrogen" should read --a nitrogen--.

In claim 4, in the equation at column 12, line 16, "$0 \leq z \leq 0.30$" should read --$0 \leq a \leq 0.30$--.

Signed and Sealed this

Ninth Day of November, 1993

BRUCE LEHMAN

*Attest:*

*Attesting Officer*    *Commissioner of Patents and Trademarks*